(No Model.)

E. L. RANSOME
MOLD FOR MOLDING CONCRETE CONTINUOUSLY.

No. 424,656. Patented Apr. 1, 1890.

Witnesses
J. H. Nourse
A. E. Lee

Inventor
Ernest L. Ransome
By his Atty. Dewey & Co.

UNITED STATES PATENT OFFICE.

ERNEST L. RANSOME, OF SAN FRANCISCO, CALIFORNIA.

MOLD FOR MOLDING CONCRETE CONTINUOUSLY.

SPECIFICATION forming part of Letters Patent No. 424,656, dated April 1, 1890.

Application filed October 9, 1889. Serial No. 326,504. (No model.)

*To all whom it may concern:*

Be it known that I, ERNEST L. RANSOME, a citizen of the United States, residing in the city and county of San Francisco, State of California, have invented an Improvement in Molding Concrete Continuously; and I hereby declare the following to be a full, clear, and exact description of the same.

My invention relates to an improvement in the manufacture of concrete molds for subways and other similar purposes; and it consists, essentially, of a continuously-moving mold about which the concrete is constantly tamped while it is in motion, and in certain details of construction which will be more fully explained by reference to the accompanying drawings, in which—

Figure 1:
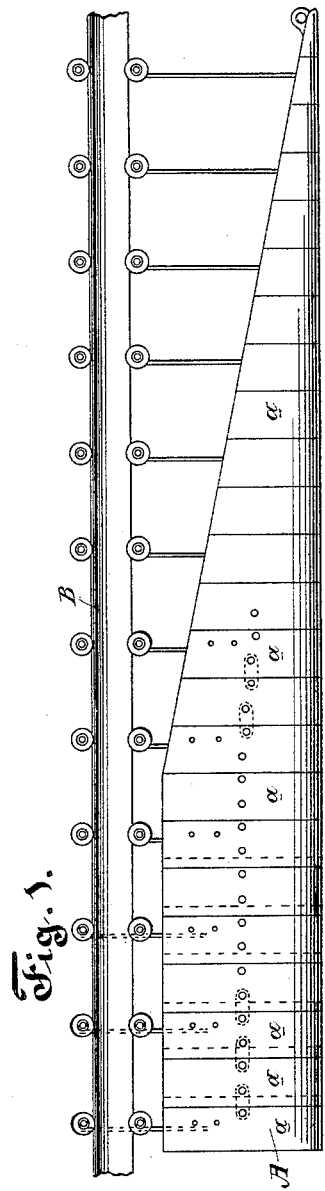
Figure 3:
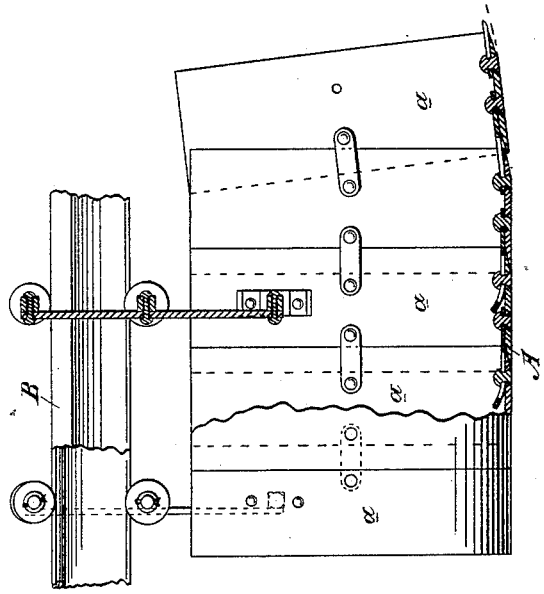
Figure 2:
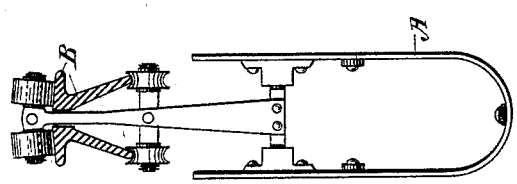

Figure 1 is a side view of my apparatus, showing also the slot-iron of a cable railway. Fig. 2 is a transverse section of the same. Fig. 3 shows the mode of jointing to turn curves.

In my former patent, No. 353,500, dated November 30, 1886, I have shown a mold for the manufacture of concrete, which is adapted to be moved forward to a certain point and to remain stationary while the material is being tamped and compacted about the mold, after which the mold is loosened and again moved forward, and again expanded after it has reached the point where the next section is to be completed. I have found by experience that if the mold is continuously moved forward at a slow rate of speed while the work is being carried on, and without any contraction of its sides for this purpose during the progress of the work, a great improvement in the work is produced.

The mold A is made of any suitable or sufficient length, so that a considerable section of the work is being carried on all the time, the front portion being commenced while the rear portion, or that which is just being left by the mold, is practically completed.

The mold A is moved forward by means of ropes or chains connected with windlass, screw, or other suitable power for producing the movement with a sufficient power and at a sufficiently slow rate. As the concrete is filled in and compacted, the friction caused by drawing the mold over and through the concrete serves to smooth it down and greatly assist in compacting it, and producing altogether a very superior and more finished result, and as no delays are necessary to move the mold and set it again for its work, it will be manifest that the work will be greatly accelerated and cheapened. As the mold is usually twenty or thirty feet in length, I prefer to make it in sections $a$, as shown, having a little play, so that it easily adapts itself to curves when in use, and it is more easily handled in sections to be moved from place to place.

When used to form the tunnel for cable roads, the mold may be suspended and guided from the slot-rails B, which are always placed before the tunnel is made, and this insures a perfect parallelism with the slot-irons and rails. Any suitable form of suspending devices may be used.

Having thus described my invention, what I claim as new, and desire to secure by Letters Patent, is—

1. A device for building concrete structures, consisting of a flexible continuously-moving mold about which the material is tamped while the mold is in motion.

2. In a device for building concrete structures, a continuously-moving mold made in sections.

3. A continuously-moving mold made in sections and having intermediate flexible joints, substantially as herein described.

4. A continuously-moving mold, in combination with the slot-irons of a cable railway and devices whereby the mold is suspended and guided from said irons, substantially as herein described.

In witness whereof I have hereunto set my hand.

ERNEST L. RANSOME.

Witnesses:
 OTIS V. SAWYER,
 S. H. NOURSE.